(12) United States Patent
Bai (10) Patent No.: US 11,514,923 B2
(45) Date of Patent: Nov. 29, 2022

(54) METHOD AND DEVICE FOR PROCESSING MUSIC FILE, TERMINAL AND STORAGE MEDIUM

(71) Applicant: BEIJING BYTEDANCE NETWORK TECHNOLOGY CO., LTD., Beijing (CN)

(72) Inventor: Hequn Bai, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/494,655

(22) Filed: Oct. 5, 2021

(65) Prior Publication Data
US 2022/0028407 A1 Jan. 27, 2022

Related U.S. Application Data

(63) Continuation of application No. PCT/CN2020/078869, filed on Mar. 11, 2020.

(30) Foreign Application Priority Data

May 8, 2019 (CN) .......................... 201910381051.6

(51) Int. Cl.
*G10L 21/0272* (2013.01)
*G10H 1/00* (2006.01)
*G10L 25/81* (2013.01)

(52) U.S. Cl.
CPC ....... *G10L 21/0272* (2013.01); *G10H 1/0008* (2013.01); *G10H 1/0091* (2013.01); *G10L 25/81* (2013.01)

(58) Field of Classification Search
CPC ... G10L 21/0272; G10L 25/81; G10L 21/003; G09B 15/00; G10H 1/00; G10H 1/0091;
(Continued)

(56) References Cited

U.S. PATENT DOCUMENTS 5,739,452 A * 4/1998 Nagata ................... G10H 1/366
84/630
11,245,950 B1 * 2/2022 Mahar ................ H04N 21/4884
(Continued)

FOREIGN PATENT DOCUMENTS

CN 105070283 A 11/2015
CN 106024005 A 10/2016
(Continued)

OTHER PUBLICATIONS

International Patent Application No. PCT/CN2020/078869; Int'l Search Report; dated Jun. 4, 2020; 2 pages.
(Continued)

*Primary Examiner* — Huyen X Vo
(74) *Attorney, Agent, or Firm* — BakerHostetler (57) ABSTRACT

Provided are a method and device for processing a music file, a terminal and a storage medium. The method comprises: in response to a received sound effect adjustment instruction, acquiring a music file, the adjustment of which is indicated by the sound effect adjustment instruction; carrying out vocals and accompaniment separation on the music file to obtain vocal data and accompaniment data in the music file; carrying out first sound effect processing on the vocal data to obtain target vocal data, and carrying out second sound effect processing on the accompaniment data to obtain target accompaniment data; and synthesizing the target vocal data and the target accompaniment data to obtain a target music file.

18 Claims, 9 Drawing Sheets

(58) Field of Classification Search
CPC .... G10H 1/043; G10H 1/36; G10H 2210/005;
G10H 2210/021; G10H 2210/155; G10H
1/0008; G10H 2210/056; G10H
2220/201; G10H 2220/395; G10H
2220/206; G10H 2220/391; G10H
2220/321; G10H 2220/355; G06F 3/01;
G06F 3/0346; G06F 3/167; G06F 3/16;
G06F 3/017; G06F 3/165; G06F 3/04883;
G11B 27/031; H04S 7/30; H04S 7/00;
H04S 7/307; H04S 2400/11; H04S
2420/13; H04S 2420/01; H04S 2420/11;
H04R 5/04; H04R 2499/11; H03F 3/68
See application file for complete search history.

(56) References Cited

U.S. PATENT DOCUMENTS

2010/0332237 A1   12/2010   Takeuchi
2018/0330707 A1   11/2018   Zhu et al.
2018/0366097 A1*  12/2018   Sharp .................... G10L 15/22

FOREIGN PATENT DOCUMENTS

| CN | 106898340 A | 6/2017 |
| CN | 106952637 A | 7/2017 |
| CN | 108538302 A | 9/2018 |
| CN | 108922506 A | 11/2018 |
| CN | 208193604 U | 12/2018 |
| JP | 2019-008336 A | 1/2019 |

OTHER PUBLICATIONS

European Patent Application No. 20801727.7; Extended Search Report; dated Apr. 21, 2022; 13 pages.

Rafii et al.; "An Overview of Lead and Accompaniment Separation in Music"; IEEE/ACM Transactions on Audio, Speech and Language Processing; vol. 26; 2018; 30 pages.

* cited by examiner

METHOD AND DEVICE FOR PROCESSING MUSIC FILE, TERMINAL AND STORAGE MEDIUM

CROSS REFERENCE OF RELATED APPLICATION

This application is a continuation of International Patent Application No. PCT/CN2020/078869 filed on Mar. 11, 2020, which claims priority to Chinese Patent Application No. 201910381051.6, titled "METHOD AND DEVICE FOR PROCESSING MUSIC FILE, TERMINAL AND STORAGE MEDIUM", filed on May 8, 2019 with the China National Intellectual Property Administration (CNIPA), both of which are incorporated herein by reference in their entireties.

FIELD

The present disclosure relates to the technical field of computers, and in particular to a method and a device for processing a music file, a terminal and a storage medium.

BACKGROUND

With the speed up of pace of life, listening to music has become a common way for relaxing. The sound effect of a piece of music directly affects auditory experience of a user. In the related art, fixed types of sound effects are provided, and an adjustment of sound effect is performed on the entire music based on the type of sound effect chosen by a user. Such processing of sound effects is not flexible. Additionally, because the fixed sound effect type may not be suitable for the music file to be played, and thus the play effect of the processed music file is not good enough, resulting in a poor user experience.

SUMMARY

In view of the above, a method and a device for processing a music file, a terminal and a storage medium are provided in embodiments of the present disclosure.

A method for processing a music file is provided according to an embodiment of the present disclosure. The method includes: acquiring, in response to a received sound effect adjustment instruction, a music file to be adjusted that is instructed by the sound effect adjustment instruction; extracting a voice and an accompaniment from the music file to obtain voice data and accompaniment data in the music file; performing a first sound effect processing on the voice data to obtain target voice data, and performing a second sound effect processing on the accompaniment data to obtain target accompaniment data; and synthesizing the target voice data and the target accompaniment data to obtain a target music file.

In the above solution, the performing a first sound effect processing on the voice data to obtain target voice data includes: acquiring a rhythm parameter corresponding to the accompaniment data, the rhythm parameter characterizing a rhythm of the music file; determining a first adjustment parameter corresponding to the rhythm parameter; and performing, based on the first adjustment parameter, the first sound effect processing on the voice data to obtain the target voice data.

In the above solution, the performing a first sound effect processing on the voice data to obtain target voice data includes: acquiring a preset second adjustment parameter indicating a target motion trajectory of the voice; and performing, based on the second adjustment parameter, the first sound effect processing on the voice data to obtain the target voice data.

In the above solution, the performing a first sound effect processing on the voice data to obtain target voice data includes: determining a motion trajectory of a terminal that plays the music file; generating a third adjustment parameter based on the motion trajectory of the terminal, where a motion trajectory of the voice indicated by the third adjustment parameter is identical to the motion trajectory of the terminal; and performing, based on the third adjustment parameter, the first sound effect processing on the voice data to obtain the target voice data.

In the above solution, the performing a second sound effect processing on the accompaniment data to obtain target accompaniment data includes: acquiring a preset accompaniment mode indicating a playback form of the accompaniment data; and performing, based on the accompaniment mode, the second sound effect processing on the accompaniment data to obtain the target accompaniment data.

In the above solution, the performing a second sound effect processing on the accompaniment data to obtain target accompaniment data includes: extracting accompaniment data corresponding to a target musical instrument from the accompaniment data in a case that the accompaniment data includes the accompaniment data corresponding to the target musical instrument; acquiring a preset fourth adjustment parameter indicating a playing orientation of the target musical instrument; and performing, based on the fourth adjustment parameter, the second sound effect processing on the accompaniment data corresponding to the target musical instrument to obtain the target accompaniment data.

The method further includes: acquiring an additional adjustment parameter for the music file including at least one of pitch, timbre, loudness, and dynamic range; and processing at least one of the voice data and the accompaniment data based on the additional adjustment parameter.

A device for processing a music file is further provided according to an embodiment of the present disclosure. The device includes: an acquisition unit, a separation unit, a processing unit and a synthesis unit. The acquisition unit is configured to acquire, in response to a received sound effect adjustment instruction, a music file to be adjusted that is instructed by the sound effect adjustment instruction. The separation unit is configured to extract a voice and an accompaniment from the music file to obtain voice data and accompaniment data in the music file. The processing unit is configured to perform a first sound effect processing on the voice data to obtain target voice data, and perform a second sound effect processing on the accompaniment data to obtain target accompaniment data. The synthesis unit is configured to synthesize the target voice data and the target accompaniment data to obtain a target music file.

In the above solution, the processing unit is further configured to: acquire a rhythm parameter corresponding to the accompaniment data, the rhythm parameter characterizing a rhythm of the music file; determine a first adjustment parameter corresponding to the rhythm parameter; and perform, based on the first adjustment parameter, the first sound effect processing on the voice data to obtain the target voice data.

In the above solution, the processing unit is further configured to: acquire a preset second adjustment parameter indicating a target motion trajectory of the voice; and perform, based on the second adjustment parameter, the first sound effect processing on the voice data to obtain the target voice data.

In the above solution, the processing unit is further configured to: determine a motion trajectory of a terminal that plays the music file; generate a third adjustment parameter based on the motion trajectory of the terminal, where a motion trajectory of the voice indicated by the third adjustment parameter is identical to the motion trajectory of the terminal; and perform, based on the third adjustment parameter, the first sound effect processing on the voice data to obtain the target voice data.

In the above solution, the processing unit is further configured to: acquire a preset accompaniment mode indicating a playback form of the accompaniment data; and perform, based on the accompaniment mode, the second sound effect processing on the accompaniment data to obtain the target accompaniment data.

In the above solution, the processing unit is further configured to: extract accompaniment data corresponding to a target musical instrument from the accompaniment data in a case that the accompaniment data includes the accompaniment data corresponding to the target musical instrument; acquire a preset fourth adjustment parameter indicating a playing orientation of the target musical instrument; and perform, based on the fourth adjustment parameter, the second sound effect processing on the accompaniment data corresponding to the target musical instrument to obtain the target accompaniment data.

In the above solution, the processing unit is further configured to: acquire an additional adjustment parameter for the music file including at least one of pitch, timbre, loudness, and dynamic range; and process at least one of the voice data and the accompaniment data based on the additional adjustment parameter.

A terminal is further provided according to an embodiment of the present disclosure. The terminal includes a memory configured to store executable instructions; and a processor configured to perform the method for processing a music file provided in the embodiment of the present disclosure when executing the executable instructions stored in the memory.

A storage medium storing executable instructions is further provided according to an embodiment of the present disclosure. The executable instructions are executed to implement the method for processing a music file according to the embodiment of the present disclosure.

Beneficial effects of the embodiments of the present disclosure are as follows. According to the above embodiments of the present disclosure, the voice and the accompaniment are extracted from the music file to obtain the voice data and the accompaniment data in the music file; the voice data and the accompaniment data are separately processed for sound effects; and then the processed data is synthesized. In this way, targeted sound effect adjustments of the voice and the accompaniment in the music file are achieved with high flexibility, and the target music file obtained based on the target voice data and the target accompaniment data suffering from respective sound effect processing has a better play effect, thereby improving user experience.

DETAILED DESCRIPTION

In the following description, an expression "some embodiments" is used to describe a subset of all possible embodiments. However, it should be understood that the "some embodiments" may indicate same or different subsets of all the possible embodiments, and the subsets may be combined with each other without a conflict.

Unless otherwise defined, all technical and scientific terms used herein have the same meanings as those commonly comprehended by the skilled in the art. Terms used herein are only for the purpose of describing detailed embodiments and are not intended to limit the present disclosure.

Flowcharts and block diagrams in the drawings of the present disclosure illustrate the architecture, functions and operations that can be implemented by the system, method and computer program product according to the embodiments of the present disclosure. Each block in a flowchart or a block diagram may represent a module, a program segment, or a part of code, and part of the module, program segment, or part of code contains one or more executable instructions for implementing the specified logical function. It should be noted that, in some alternative implementations, the functions marked in blocks may be performed in an order different from the order shown in the drawings. For example, two blocks shown in succession may actually be executed in parallel, or sometimes may be executed in a reverse order, which depends on the functions involved. It is to be noted that each block in a block diagram and/or flowchart, and a combination of the blocks in a block diagram and/or flowchart, may be implemented by a dedicated hardware-based system that performs the specified functions or operations, or may be realized by a combination of dedicated hardware and computer instructions.

Figure 1:
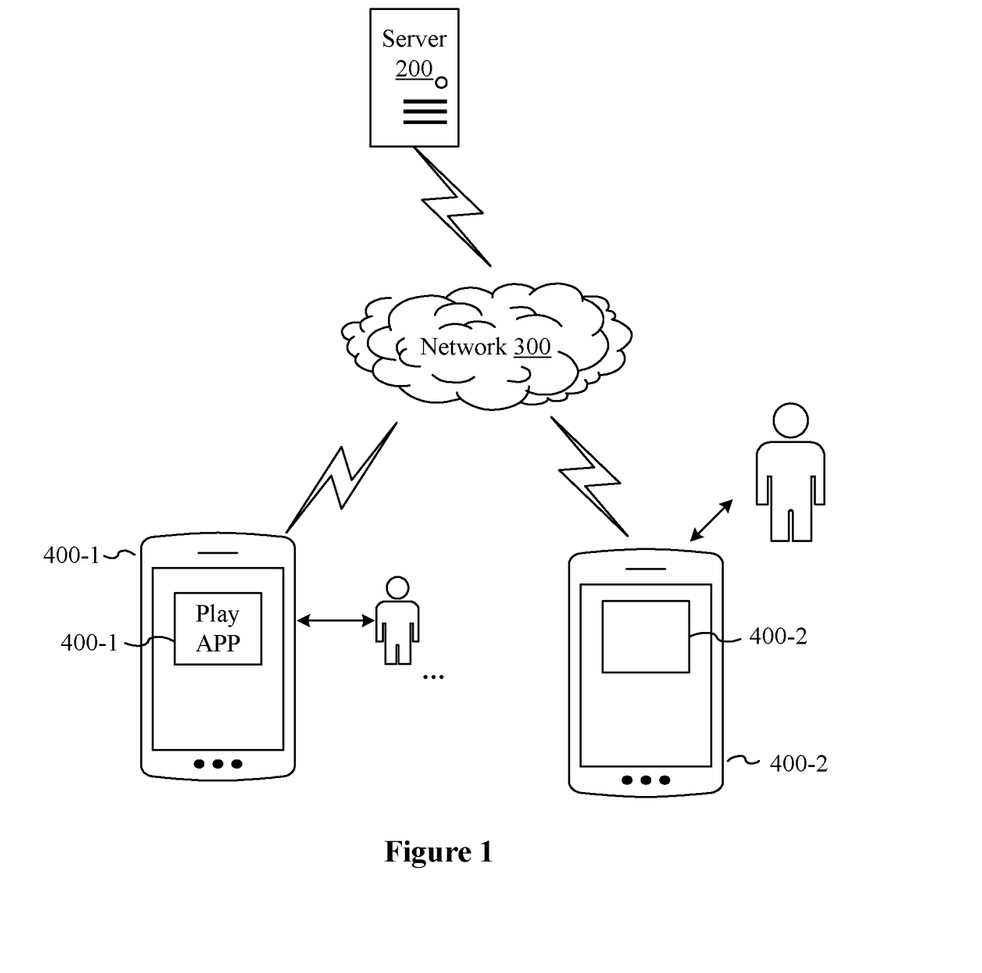
FIG. 1 is a schematic architectural diagram of a system for processing a music file according to an embodiment of the present disclosure.

Reference is made to FIG. 1, which is a schematic architectural diagram of a system for processing a music file according to an embodiment of the present disclosure. In order to support an exemplary application, a terminal 400 (which includes a terminal 400-1 (including a graphical interface 410-1) and a terminal 400-2 (including a graphical interface 410-2)) is connected to a server 200 through a network 300. The terminal is installed with a play client, through which a user can operate to play music. The network 300 may be a Wide Area Network or a Local Area Network, or a combination thereof, and the network 300 performs data transmission through wireless links.

The terminal 400 (such as the terminal 400-1) is configured to send, in response to a received sound effect adjustment instruction, an acquisition request for a music file to the server 200.

The server 200 is configured to return the corresponding music file in response to the received acquisition request.

The terminal 400 (such as the terminal 400-1) is further configured to: extract a voice and an accompaniment from the received music file to obtain voice data and accompaniment data in the music file; perform a first sound effect processing on the voice data to obtain target voice data, and perform a second sound effect processing on the accompaniment data to obtain a target accompaniment data; and synthesize the target voice data and the target accompaniment data to obtain a target music file.

The expression "in response to" used herein indicates a condition or state that an execution of an operation depends on. When the condition or state is satisfied, one or more operations may be executed in real time or with a set delay. Unless otherwise specified, the order in which multiple operations are executed is not limited.

In some embodiment, the terminal 400 (such as the terminal 400-1) is installed with a play client, through which the terminal may play music. When a user triggers a sound effect adjustment instruction, the play client acquires a music file to be adjusted that is instructed by the sound effect adjustment instruction. A voice and an accompaniment are extracted from the music file to obtain voice data and accompaniment data in the music file. A first sound effect processing is performed on the voice data to obtain target voice data, and a second sound effect processing is performed on the accompaniment data to obtain target accompaniment data. The target voice data and the target accompaniment data are synthesized to obtain a target music file. The target music file is played.

A device for processing a music file according to an embodiment of the present disclosure is illustrated hereinafter. The device for processing a music file according to the embodiment of the present disclosure may be implemented in various forms. For example, the device may be implemented by a standalone terminal such as a smart phone, a tablet computer, a desktop computer, or may be implemented by a terminal and a server in cooperation. The device for processing a music file according to the embodiment of the present disclosure may be implemented in a manner of hardware, software, or a combination thereof. Various exemplary implementations of the device for processing a music file provided in the embodiments of the present disclosure are described below.

Figure 2:
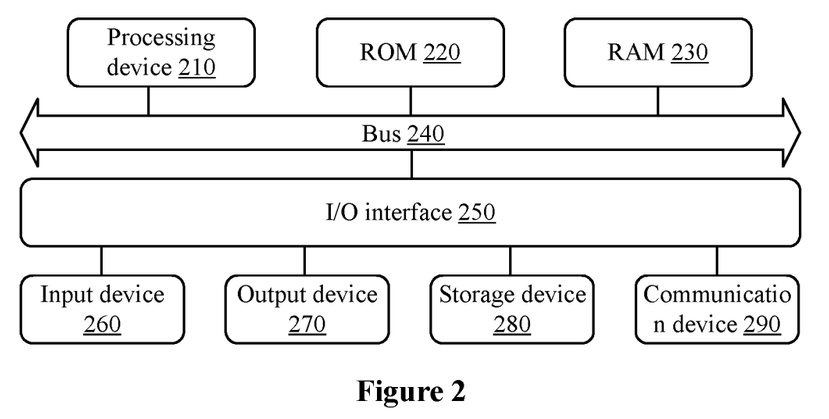
FIG. 2 is a schematic diagram of a structure of a device for processing a music file according to an embodiment of the present disclosure.

A hardware structure of the device for processing a music file according to an embodiment of the present disclosure is described in detail below. FIG. 2 is a schematic diagram of a structure of the device for processing a music file according to an embodiment of the present disclosure. The device composition shown in FIG. 2 is only schematic, and is not intended to limit a function and use of the embodiment of the present disclosure.

As shown in FIG. 2, the device for processing a music file may include a processing device (such as a Central Processing Unit or a Graphics Processing Unit) 210, which may execute various operations and processing through a program stored in a Read Only Memory (ROM) 220 or a program loaded from a storage device 280 into a Random Access Memory (RAM) 230. The RAM 230 is configured to store various programs and data required by the terminal. The processing device 210, the ROM 220 and the RAM 230 are connected to each other via a bus 240. An Input/output (I/O) interface 250 is also connected to the bus 240.

Generally, the I/O interface 250 may be connected to: an input device 260, such as a touch screen, a touch panel, a keyboard, a mouse, a camera, a microphone, an accelerometer, and a gyroscope; an output device 270, such as a liquid crystal display (LCD), a speaker, and a vibrator; a storage device 280 such as a magnetic tape and a hard disk; and a communication device 290. The communication device 290 enables wireless or wired communication between the terminal and other devices for data exchanging. Although FIG. 2 shows various devices included, it should be understood that the illustrated devices are not necessarily required to all be implemented or included. Alternatively, more or fewer devices may be implemented or included.

Particularly, according to an embodiment of the present disclosure, a procedure described with the provided flowchart may be implemented as a computer program. For example, a computer program product is further provided according to an embodiment of the present disclosure. The computer program product includes a computer program stored in a computer readable medium. The computer program includes program codes for performing the method shown in the flowchart. In the embodiment, the computer program may be downloaded and installed from the network via the communication device 290, or installed from the storage device 280, or installed from the ROM 220. When the computer program is executed by the processing device 210, the functions defined in the method according to the embodiment of the present disclosure are performed.

It is to be noted that, the computer readable medium mentioned herein may be a computer readable signal medium or a computer readable storage medium or any combination thereof. The computer readable storage medium may include, but is not limited to, a system, an apparatus, or a device in an electronic, magnetic, optical, electromagnetic, infrared, or semi-conductive form, or any combination thereof. The computer readable storage medium may include, but is not limited to, an electrical connection with one or more wires, a portable computer disk, a hard disk, a random access memory (RAM), a read-only memory (ROM), an erasable programmable read-only memory (EPROM or flash memory), an optical fiber, a portable compact disc read-only memory (CD-ROM), a light storage device, a magnetic storage device or any combination thereof.

In the embodiment of the present disclosure, the computer readable storage medium may be any tangible medium containing or storing a program, and the program may be used by or in combination with an instruction execution system, apparatus, or device. In the embodiment of the present disclosure, the computer readable signal medium may include a data signal transmitted in a baseband or transmitted as a part of a carrier, and the data signal carries computer readable program codes. The transmitted data signal may be in various forms, including but not limited to an electromagnetic signal, an optical signal or any proper combination thereof. The computer readable signal medium may be any computer readable medium other than the computer readable storage medium, and can send, propagate or transmit programs to be used by or in combination with an instruction execution system, apparatus or device. The program codes stored in the computer readable medium may be transmitted via any proper medium including, but not limited to, a wire, an optical cable, radio frequency (RF) and the like, or any proper combination thereof.

The computer readable medium may be incorporated in the above-mentioned terminal, or may exist alone without being assembled into the terminal.

The computer readable medium carries one or more programs. The programs, when being executed by the terminal, cause the terminal to perform the method for processing a music file provided in the embodiment of the present disclosure.

The computer program code for performing the operations disclosed in the embodiments of the present disclosure may be written in one or more programming languages or combinations thereof. The programming languages include an object-oriented programming language, such as Java, Smalltalk, and C++, and a conventional procedural programming language, such as C language or a similar programming language. The program code may be executed entirely on a user computer, partially on the user computer, as a standalone software package, partially on the user computer and partially on a remote computer, or entirely on the remote computer or a server. In a case involving a remote computer, the remote computer may be connected to a user computer or an external computer through any kind of network including a Local Area Network (LAN) or a Wide Area Network (WAN). For example, the remote computer may be connected to the external computer through an Internet connection supported by an Internet service provider.

The units and/or modules mentioned in the embodiments of the present disclosure may be implemented by means of software or hardware.

In terms of a hardware implementation, the units and/or modules of the terminal provided in the embodiments of the present disclosure may be implemented by one or more Application Specific Integrated Circuits (ASICs), DSPs, Programmable Logic Devices (PLDs), Complex Programmable Logic Devices (CPLDs), Field-Programmable Gate Arrays (FPGAs) or other electronic elements, in order to perform the method provided in the embodiments of the present disclosure.

Figure 3:
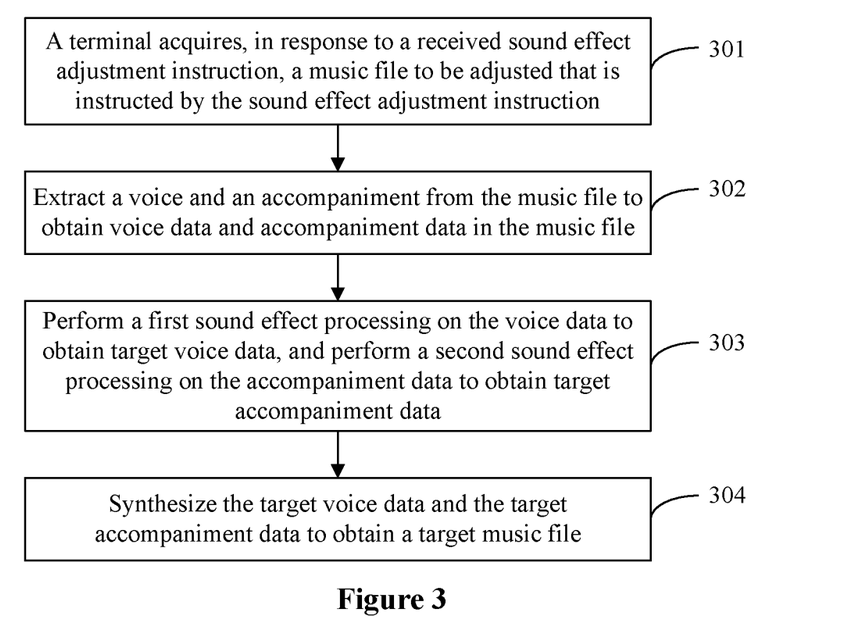
FIG. 3 is a schematic flowchart of a method for processing a music file according to an embodiment of the present disclosure.

FIG. 3 is a schematic flowchart of a method for processing a music file according to an embodiment of the present disclosure. Referring to FIG. 3, the method for processing a music file includes steps 301 to 304.

In step 301, in response to a received sound effect adjustment instruction, a music file to be adjusted that is instructed by the sound effect adjustment instruction is acquired.

Figure 4:
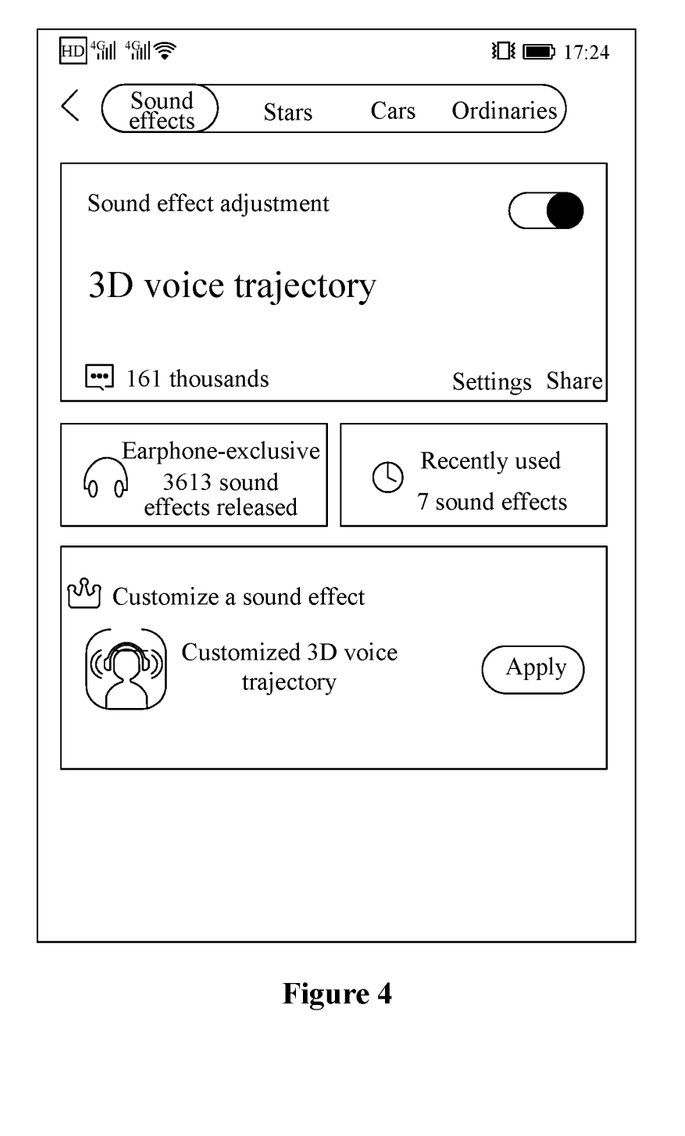
FIG. 4 is a schematic diagram of an interface for sound effect adjustment displayed on a play client according to an embodiment of the present disclosure.

In a practical application, a terminal is installed with a play client, through which a user may operate to play music. The play client has a function of sound effect adjustment. For example, the user may trigger the sound effect adjustment instruction through a sound effect adjustment button displayed on a page of the play client, to adjust playing sound effect of the music file. FIG. 4 is a schematic diagram of an interface for sound effect adjustment displayed on a play client according to an embodiment of the present disclosure. Referring to FIG. 4, when the user clicks the sound effect adjustment button, a corresponding sound effect adjustment instruction is triggered.

In some embodiments, the user may trigger the sound effect adjustment instruction before the music file is played, so as to process the sound effect of the music file to be played. Alternatively, the user may trigger the sound effect adjustment instruction when the play client is playing music, so as to adjust the sound effect of the music file being played.

In some embodiments, the sound effect adjustment instruction carries a music file identifier, and the terminal acquires a music file represented by the music file identifier from the terminal or the server. In a practical application, the music file may be in a format of streaming media (RM format) or non-streaming media (such as Mp4 format). Correspondingly, the music file acquired by the terminal may be either a complete music file or a segmented music file. For example, when playing the music file, the play client requests a segment of the music file from the server based on a current playback point for the music file. The server returns the corresponding segmented music file to the play client by streaming.

In step 302, a voice and an accompaniment are extracted from the music file to obtain voice data and accompaniment data in the music file.

In some embodiments, the voice and the accompaniment may be extracted from the music file by a neural network model (such as a Recurrent Neural Network (RNN)) obtained by training. For example, music data of the acquired music file is inputted into an input layer of the neural network model. The music data is processed through a hidden layer, and extracted voice data and accompaniment data are outputted through the output layer.

In some embodiments, the voice and the accompaniment may be extracted from the music file by means of signal processing. For example, an audio signal corresponding to the music file is acquired and a waveform of the audio signal is determined. Then the voice data and the accompaniment data in the music data included in the music file are determined based on the audio signal waveform.

In step 303, a first sound effect processing is performed on the voice data to obtain target voice data, and a second sound effect processing is performed on the accompaniment data to obtain target accompaniment data.

In some embodiments, a dynamic change rate of the voice may be adjusted based on a rhythm feature of the music file. Specifically, the process of performing the first sound effect processing on the voice data to obtain target voice data may include: acquiring a rhythm parameter corresponding to the accompaniment data, the rhythm parameter characterizing a rhythm of the music file; determining a first adjustment parameter corresponding to the rhythm parameter, the first adjustment parameter being used to adjust the dynamic change rate of the voice; and performing, based on the first adjustment parameter, the first sound effect processing on the voice data to obtain the target voice data.

In practice, the rhythm parameter may be a beat frequency corresponding to the accompaniment data. Specifically, a beat per minute (bmp) of the accompaniment data is calculated, and the first adjustment parameter is determined based on the bmp value of the accompaniment data. In some embodiments, the beat frequency of the accompaniment data is related to the first adjustment parameter. That is, the faster the rhythm of the music file is, the faster the change rate of the voice is adjusted. In this way, a play effect of the voice and a play effect of the accompaniment are adapted to each other, so that users feel that the voice and the accompaniment are monolithic, thereby improving auditory experience of the users.

In some embodiments, an adjustment parameter for the voice may be preset, and a motion trajectory of the voice may be adjusted through the preset adjustment parameter. Specifically, the process of performing the first sound effect processing on the voice data to obtain the target voice data may include: acquiring a preset second adjustment parameter indicating a target motion trajectory of the voice; and performing, based on the second adjustment parameter, the first sound effect processing on the voice data to obtain the target voice data.

Figure 5:
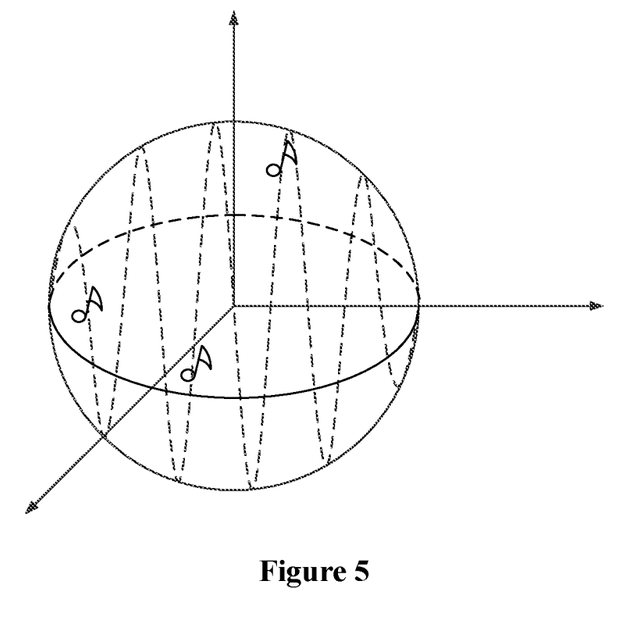
FIG. 5 is a schematic diagram of a three-dimensional motion trajectory of a voice according to an embodiment of the present disclosure.
Figure 6:
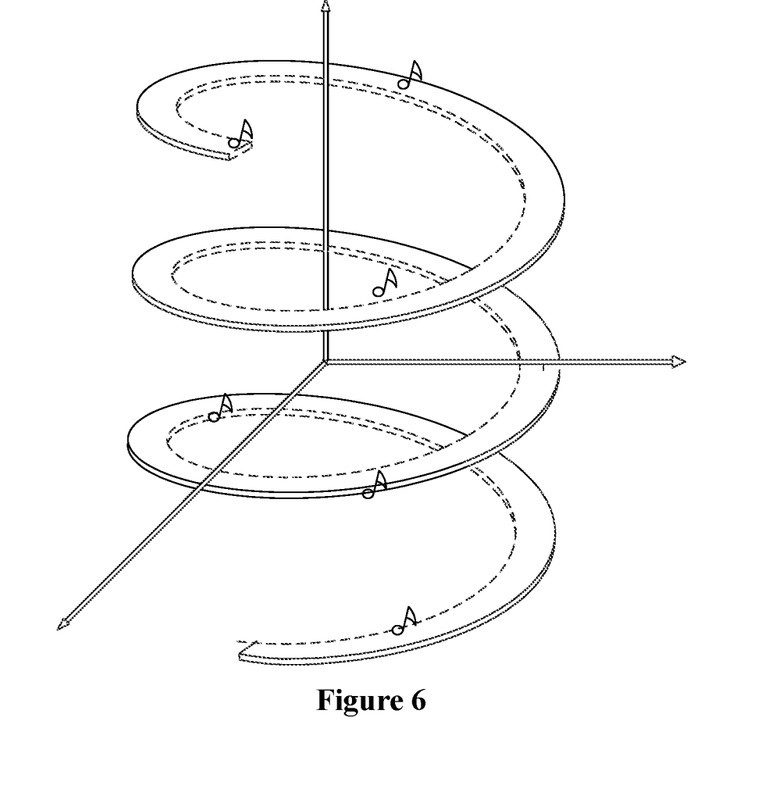
FIG. 6 is a schematic diagram of a three-dimensional motion trajectory of a voice according to an embodiment of the present disclosure.

In practice, as shown in FIG. 4, in a case that a 3D voice trajectory included in the sound effect adjustment is triggered by the user, the target motion trajectory of the voice may be a three-dimensional motion trajectory. The target motion trajectory of the voice may be set based on an actual demand. FIG. 5 is a schematic diagram of a three-dimensional motion trajectory of a voice according to an embodiment of the present disclosure. Referring to FIG. 5, the target motion trajectory of the voice may travel with a reference of a circle on a horizontal plane while going up and down on a vertical plane, the motion trajectory on the vertical plane being a sinusoid or similar to a sinusoid. Reference is made to FIG. 6, which is a schematic diagram of the three-dimensional motion trajectory of a voice according to an embodiment of the present disclosure. The target motion trajectory of the voice may travel with a reference of a circle on a horizontal plane while going up and down on a vertical plane, the motion trajectory on the vertical plane being an S-curve.

The user listens to music by means of the play client in the terminal in following scenarios. In which, the user is immersed in the music and dances with the mobile phone in hand, or the user taps a rhythm of the music while grasping the mobile phone, the mobile phone moves in accompany with the user with a same motion trajectory. In some embodiments, based on the music playing scenario, the motion trajectory of the terminal may function as the motion trajectory of the voice in the music file. Specifically, the process of performing the first sound effect processing on the voice data to obtain the target voice data may include: determining a motion trajectory of the terminal that plays the music file; generating a third adjustment parameter based on the motion trajectory of the terminal, where a motion trajectory of the voice indicated by the third adjustment parameter is identical to the motion trajectory of the terminal; and performing, based on the third adjustment parameter, the first sound effect processing on the voice data to obtain the target voice data.

Figure 7:
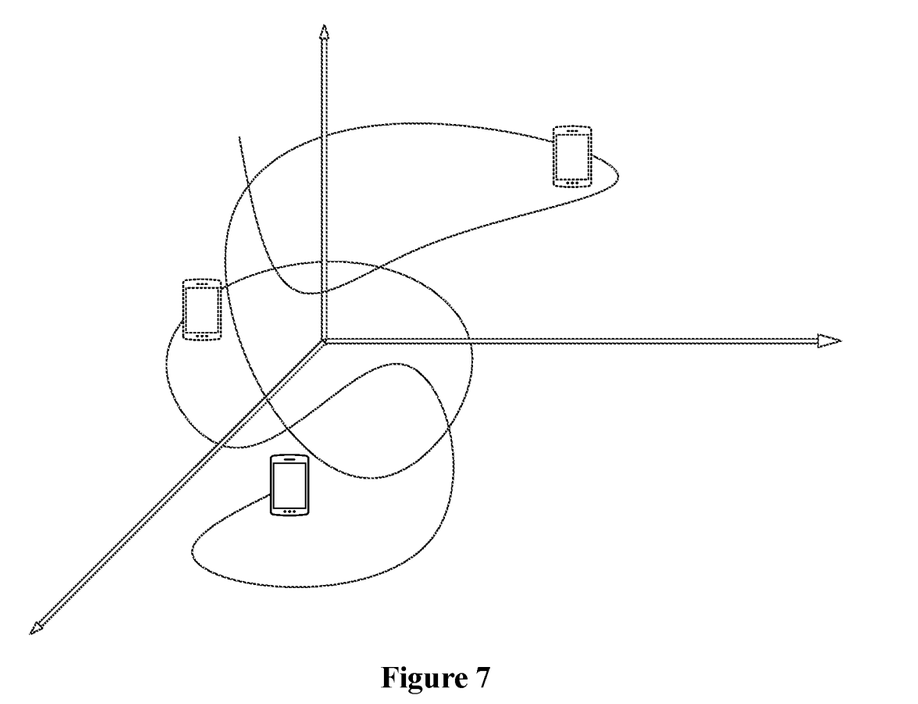
FIG. 7 is a schematic diagram of a three-dimensional motion trajectory of a terminal according to an embodiment of the present disclosure.

In practice, the terminal is provided with a three-axis sensor or a six-axis sensor to accurately capture and record a three-dimensional trajectory of the terminal movement. The recorded three-dimensional trajectory of the terminal may be adjusted by, for example, smoothing processing, center position correction, and the like. The adjusted three-dimensional trajectory may function as the motion trajectory of the voice. As shown in FIG. 4, when a custom 3D voice trajectory is triggered by the user, the motion trajectory of the terminal functions as the motion trajectory of the voice. FIG. 7 is a schematic diagram of a three-dimensional motion trajectory of a terminal according to an embodiment of the present disclosure. The voice data of the music file is controlled by using the motion trajectory of the terminal as the motion trajectory of the voice, so that the sound heard by the user dynamically changes with a gesture of the user, thereby improving the dynamic sensing of music and user interaction, and thus improving user experience.

In some embodiments, the first sound effect processing on the voice data may be performed by: rendering the voice data in three dimensions based on the first adjustment parameter or the second adjustment parameter or the third adjustment parameter, to obtain the target voice data. For example, an HRTF technology or Ambisonic technology may be applied to accurately simulate a 3D effect of sound. Additionally, with appropriate reverb technology, a sense of distance of the sound and a sense of broadness of the sound field can be simulated.

In some embodiments, the process of performing the second sound effect processing on the accompaniment data to obtain the target accompaniment data may include: acquiring a preset accompaniment mode indicating a playback form of the accompaniment data; and performing, based on the acquired accompaniment mode, the second sound effect processing on the accompaniment data to obtain the target accompaniment data.

In practice, multiple accompaniment modes may be preset, such as a surround sound mode. When the surround sound mode is applied, the accompaniment presents statically in a form of surround sound around the user.

In practice, the accompaniment data includes accompaniment data corresponding to a certain musical instrument or target musical instrument (such as a drum). The accompaniment data corresponding to the target musical instrument may be processed separately. In some embodiments, the process of performing the second sound effect processing on the accompaniment data to obtain the target accompaniment data may include: extracting the accompaniment data corresponding to the target instrument from the accompaniment data; acquiring a preset fourth adjustment parameter indicating a playing orientation of the target musical instrument; and performing, based on the fourth adjustment parameter, the second sound effect processing on the accompaniment data corresponding to the target musical instrument to obtain the target accompaniment data.

In an example where the target musical instrument is a drum, the accompaniment data corresponding to the drum is processed based on the preset fourth adjustment parameter, so that drum sound dynamically appears at certain orientations, which is similar to a laser light in a nightclub flashing at different positions, thereby improving auditory experience of the user.

In some embodiments, the voice data and and/or the accompaniment data obtained from the music file may be customized based on an additional adjustment parameter. Specifically, an additional adjustment parameter for the music file is acquired, including at least one of pitch, timbre, loudness, and dynamic range; and the voice data and/or the accompaniment data are processed based on the acquired additional adjustment parameter. Practically, in a case that the accompaniment data includes drum sound data, the drum sound data may be enhanced or weakened separately.

In step 304, the target voice data and the target accompaniment data are synthesized to obtain a target music file.

In some embodiments, the obtained target music file may be played and released (uploaded).

According to the above embodiments of the present disclosure, the voice and the accompaniment are extracted from the music file to obtain the voice data and the accompaniment data in the music file; the voice data and the accompaniment data are separately processed for sound effects; and then the processed data is synthesized. In this way, targeted sound effect adjustments of the voice and the accompaniment in the music file are achieved with high flexibility, and the target music file obtained based on the target voice data and the target accompaniment data suffering from respective sound effect processing has a better play effect, thereby improving user experience.

Figure 8:
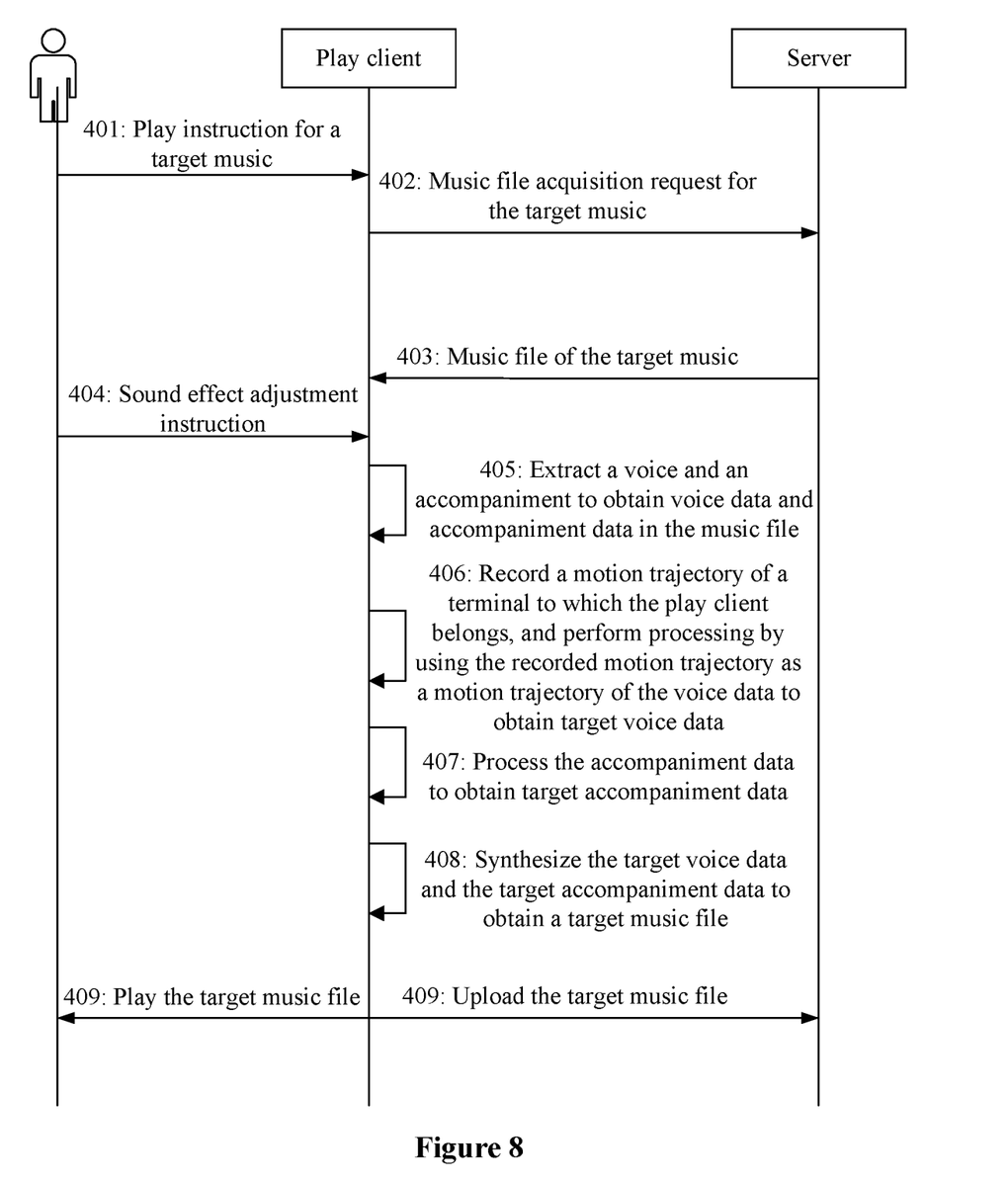
FIG. 8 is a schematic flowchart of a method for processing a music file according to an embodiment of the present disclosure.

FIG. 8 is a schematic flowchart of a method for processing a music file according to an embodiment of the present disclosure. The method may be implemented through a play client installed in a terminal. Referring to FIG. 8, the method for processing a music file according to the embodiment of the present disclosure includes steps 401 to 409.

In step 401, a play instruction for a target music triggered by a user is received by the play client.

In practice, the user may trigger the play instruction for the target music by clicking an identifier (such as a music name/icon) of the target music on a music play interface displayed by the play client.

In step 402, a music file acquisition request for the target music is sent to a server by the play client.

In practice, the music file acquisition request carries a music file identifier of the target music.

In step 403, a music file of the target music returned by the server is received by the play client.

In step 404, a sound effect adjustment instruction is received by the play client when the music file is being played.

In a practical application, the user may trigger the sound effect adjustment instruction for the music file being currently played by clicking a sound effect adjustment button on the music play interface displayed by the play client.

In step 405, a voice and an accompaniment are extracted from the music file by the play client to obtain voice data and accompaniment data in the music file.

In step 406, a motion trajectory of a terminal to which the play client belongs is recorded by the play client, and the recorded motion trajectory functions as a motion trajectory of the voice data for processing to obtain target voice data.

Here, the motion trajectory of the terminal may be recorded through a gyroscope, a gravitational acceleration sensor and other sensors in the terminal.

In step 407, the accompaniment data is processed by the play client based on a preset accompaniment mode to obtain target accompaniment data.

Here, the accompaniment mode indicates a playback form of the accompaniment data, for example, a form of surround sound.

In step 408, the target voice data and the target accompaniment data are synthesized by the play client to obtain a target music file.

In step 409, the target music file is played and uploaded to the server through the play client.

Figure 9:
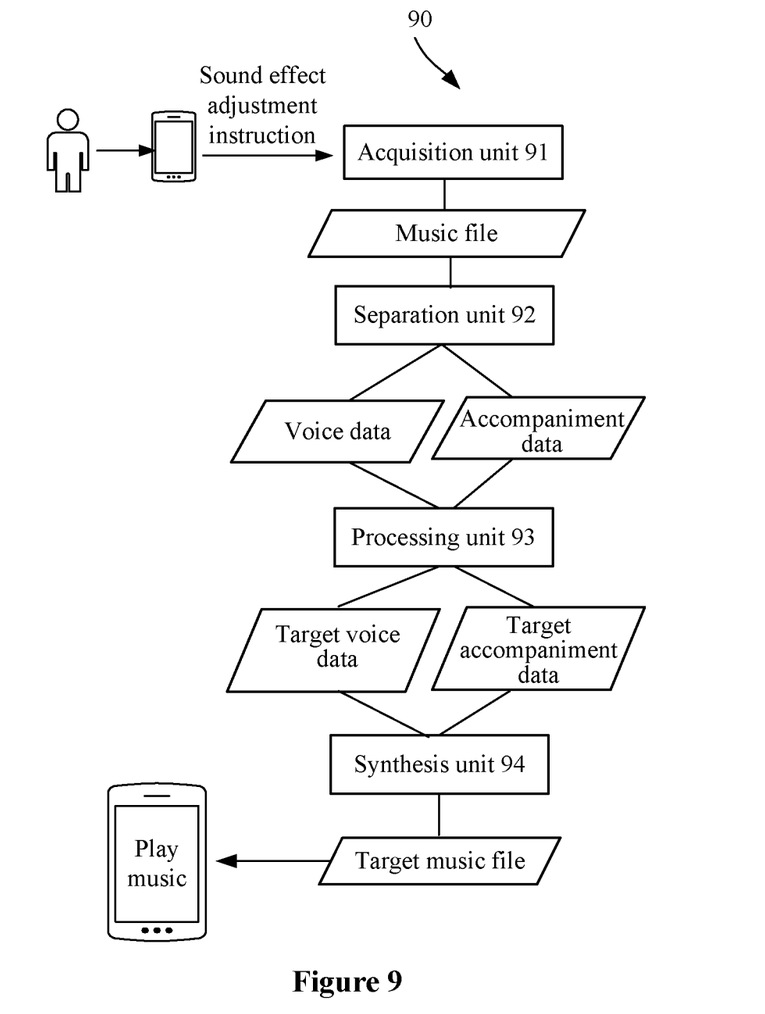
FIG. 9 is a schematic diagram of a structure of a device for processing a music file according to an embodiment of the present disclosure.

A software implementation of the device for processing a music file according to an embodiment of the present disclosure is further illustrated as follows. FIG. 9 is a schematic diagram of a structure of a device for processing a music file according to an embodiment of the present disclosure. Referring to FIG. 9, the device for processing a music file includes: an acquisition unit 91, a separating unit 92, a processing unit 93 and a synthesis unit 94. The acquisition unit 91 is configured to acquire, in response to a received sound effect adjustment instruction, a music file to be adjusted that is instructed by the sound effect adjustment instruction. The separation unit 92 is configured to extract a voice and an accompaniment from the music file to obtain voice data and accompaniment data in the music file. The processing unit 93 is configured to perform a first sound effect processing on the voice data to obtain target voice data, and perform a second sound effect processing on the accompaniment data to obtain target accompaniment data. The synthesis unit 94 is configured to synthesize the target voice data and the target accompaniment data to obtain a target music file.

In some embodiments, the device further includes a playing unit 95 configured to play the target music file.

In some embodiments, the processing unit is further configured to: acquire a rhythm parameter corresponding to the accompaniment data, the rhythm parameter characterizing a rhythm of the music file; determine a first adjustment parameter corresponding to the rhythm parameter; and perform, based on the first adjustment parameter, the first sound effect processing on the voice data to obtain the target voice data.

In some embodiments, the processing unit is further configured to: acquire a preset second adjustment parameter indicating a target motion trajectory of the voice; and perform, based on the second adjustment parameter, the first sound effect processing on the voice data to obtain the target voice data.

In some embodiments, the processing unit is further configured to: determine a motion trajectory of a terminal that plays the music file; generate a third adjustment parameter based on the motion trajectory of the terminal, where a motion trajectory of the voice indicated by the third adjustment parameter is identical to the motion trajectory of the terminal; and perform, based on the third adjustment parameter, the first sound effect processing on the voice data to obtain the target voice data.

In some embodiments, the processing unit is further configured to: acquire a preset accompaniment mode indicating a playback form of the accompaniment data; and perform, based on the accompaniment mode, the second sound effect processing on the accompaniment data to obtain the target accompaniment data.

In some embodiments, the processing unit is further configured to: extract accompaniment data corresponding to a target musical instrument from the accompaniment data in a case that the accompaniment data includes the accompaniment data corresponding to the target musical instrument; acquire a preset fourth adjustment parameter indicating a playing orientation of the target musical instrument; and perform, based on the fourth adjustment parameter, the second sound effect processing on the accompaniment data corresponding to the target musical instrument to obtain the target accompaniment data.

In some embodiments, the processing unit is further configured to: acquire an additional adjustment parameter for the music file including at least one of pitch, timbre, loudness, and dynamic range; and process at least one of the voice data and the accompaniment data based on the additional adjustment parameter.

It should be noted that the foregoing description related to the device for processing a music file is similar to the foregoing description of the method for processing a music file. Beneficial effect of the device is similar to that of the method, and is not repeated herein. For technical details that are not disclosed in the device embodiments of the present disclosure, one may refer to the description of the method embodiments of the present disclosure.

A terminal is further provided according to an embodiment of the present disclosure. The terminal includes: a memory configured to store executable instructions; and a processor configured to perform the method for processing a music file provided in the embodiment of the present disclosure when executing the executable instructions stored in the memory.

A readable storage medium is further provided according to an embodiment of the present disclosure. The storage medium may include a mobile storage device, a random access memory (RAM), a read-only memory (ROM), a magnetic disk, an optical disk or other mediums that can store program codes. The readable storage medium stores executable instructions. The executable instructions are executed to implement the method for processing a music file provided in the embodiment of the present disclosure.

Only specific embodiments of the present disclosure are described above, and the scope of protection of the present disclosure is not limited thereto. Changes and substitutions which may be easily contemplated by those skilled in the art within the technical scope disclosed in the present disclosure shall fall within the scope of protection of the present disclosure. Therefore, the scope of protection of the present disclosure shall be defined by the appended claims.

The invention claimed is:

1. A method for processing a music file, comprising:
    acquiring, in response to a received sound effect adjustment instruction, a music file to be adjusted that is instructed by the sound effect adjustment instruction;
    extracting a voice and an accompaniment from the music file to obtain voice data and accompaniment data in the music file;
    performing a first sound effect processing on the voice data to obtain target voice data, and performing a second sound effect processing on the accompaniment data to obtain target accompaniment data, wherein the performing a second sound effect processing on the accompaniment data to obtain target accompaniment data comprises:
        acquiring a preset accompaniment mode indicating a playback form of the accompaniment data, and
        performing, based on the preset accompaniment mode, the second sound effect processing on the accompaniment data to obtain the target accompaniment data; and
    synthesizing the target voice data and the target accompaniment data to obtain a target music file.

2. The method according to claim 1, wherein the performing a first sound effect processing on the voice data to obtain target voice data comprises:
    acquiring a rhythm parameter corresponding to the accompaniment data, the rhythm parameter characterizing a rhythm of the music file;
    determining a first adjustment parameter corresponding to the rhythm parameter; and
    performing, based on the first adjustment parameter, the first sound effect processing on the voice data to obtain the target voice data.

3. The method according to claim 1, wherein the performing a first sound effect processing on the voice data to obtain target voice data comprises:
    acquiring a preset second adjustment parameter indicating a target motion trajectory of the voice; and
    performing, based on the second adjustment parameter, the first sound effect processing on the voice data to obtain the target voice data.

4. The method according to claim 1, wherein the performing a first sound effect processing on the voice data to obtain target voice data comprises:
    determining a motion trajectory of a terminal that plays the music file;
    generating a third adjustment parameter based on the motion trajectory of the terminal, wherein a motion trajectory of the voice indicated by the third adjustment parameter is identical to the motion trajectory of the terminal; and
    performing, based on the third adjustment parameter, the first sound effect processing on the voice data to obtain the target voice data.

5. The method according to claim 1, wherein the performing a second sound effect processing on the accompaniment data to obtain target accompaniment data comprises:
    extracting accompaniment data corresponding to a target musical instrument from the accompaniment data in a case that the accompaniment data comprises the accompaniment data corresponding to the target musical instrument;
    acquiring a preset fourth adjustment parameter indicating a playing orientation of the target musical instrument; and
    performing, based on the fourth adjustment parameter, the second sound effect processing on the accompaniment data corresponding to the target musical instrument to obtain the target accompaniment data.

6. The method according to claim 1, further comprising:
    acquiring an additional adjustment parameter for the music file comprising at least one of pitch, timbre, loudness, and dynamic range; and
    processing at least one of the voice data and the accompaniment data based on the additional adjustment parameter.

7. A device for processing a music file, comprising:
    a memory configured to store executable instructions; and
    a processor, when executing the executable instructions stored in the memory, configured to perform the operations of:
    acquiring, in response to a received sound effect adjustment instruction, a music file to be adjusted that is instructed by the sound effect adjustment instruction;
    extracting a voice and an accompaniment from the music file to obtain voice data and accompaniment data in the music file;
    performing a first sound effect processing on the voice data to obtain target voice data, and perform a second sound effect processing on the accompaniment data to obtain target accompaniment data, wherein the performing a second sound effect processing on the accompaniment data to obtain target accompaniment data comprises:
        acquiring a preset accompaniment mode indicating a playback form of the accompaniment data, and
        performing, based on the preset accompaniment mode, the second sound effect processing on the accompaniment data to obtain the target accompaniment data; and
    synthesizing the target voice data and the target accompaniment data to obtain a target music file.

8. The device according to claim 7, wherein the processor, when executing the executable instructions stored in the memory, configured to perform the operations of:
    acquiring a rhythm parameter corresponding to the accompaniment data, the rhythm parameter characterizing a rhythm of the music file;
    determining a first adjustment parameter corresponding to the rhythm parameter; and
    performing, based on the first adjustment parameter, the first sound effect processing on the voice data to obtain the target voice data.

9. The device according to claim 7, wherein the processor, when executing the executable instructions stored in the memory, configured to perform the operations of:
    acquiring a preset second adjustment parameter indicating a target motion trajectory of the voice; and
    performing, based on the second adjustment parameter, the first sound effect processing on the voice data to obtain the target voice data.

10. The device according to claim 7, wherein the processor, when executing the executable instructions stored in the memory, configured to perform the operations of:
- determining a motion trajectory of a terminal that plays the music file;
- generating a third adjustment parameter based on the motion trajectory of the terminal, wherein a motion trajectory of the voice indicated by the third adjustment parameter is identical to the motion trajectory of the terminal; and
- performing, based on the third adjustment parameter, the first sound effect processing on the voice data to obtain the target voice data.

11. The device according to claim 7, wherein the processor, when executing the executable instructions stored in the memory, configured to perform the operations of:
- extracting accompaniment data corresponding to a target musical instrument from the accompaniment data in a case that the accompaniment data comprises the accompaniment data corresponding to the target musical instrument;
- acquiring a preset fourth adjustment parameter indicating a playing orientation of the target musical instrument; and
- performing, based on the fourth adjustment parameter, the second sound effect processing on the accompaniment data corresponding to the target musical instrument to obtain the target accompaniment data.

12. The device according to claim 7, wherein the processor, when executing the executable instructions stored in the memory, configured to perform the operations of:
- acquiring an additional adjustment parameter for the music file comprising at least one of pitch, timbre, loudness, and dynamic range; and
- processing at least one of the voice data and the accompaniment data based on the additional adjustment parameter.

13. A non-transitory storage medium storing executable instructions, wherein the executable instructions are executed to implement operations comprising:
- acquiring, in response to a received sound effect adjustment instruction, a music file to be adjusted that is instructed by the sound effect adjustment instruction;
- extracting a voice and an accompaniment from the music file to obtain voice data and accompaniment data in the music file;
- performing a first sound effect processing on the voice data to obtain target voice data, and performing a second sound effect processing on the accompaniment data to obtain target accompaniment data, wherein the performing a second sound effect processing on the accompaniment data to obtain target accompaniment data comprises:
  - acquiring a preset accompaniment mode indicating a playback form of the accompaniment data, and
  - performing, based on the accompaniment mode, the second sound effect processing on the accompaniment data to obtain the target accompaniment data; and
- synthesizing the target voice data and the target accompaniment data to obtain a target music file.

14. The non-transitory storage medium of claim 13, the operations further comprising:
- acquiring a rhythm parameter corresponding to the accompaniment data, the rhythm parameter characterizing a rhythm of the music file;
- determining a first adjustment parameter corresponding to the rhythm parameter; and
- performing, based on the first adjustment parameter, the first sound effect processing on the voice data to obtain the target voice data.

15. The non-transitory storage medium of claim 13, the operations further comprising:
- acquiring a preset second adjustment parameter indicating a target motion trajectory of the voice; and
- performing, based on the second adjustment parameter, the first sound effect processing on the voice data to obtain the target voice data.

16. The non-transitory storage medium of claim 13, the operations further comprising:
- determining a motion trajectory of a terminal that plays the music file;
- generating a third adjustment parameter based on the motion trajectory of the terminal, wherein a motion trajectory of the voice indicated by the third adjustment parameter is identical to the motion trajectory of the terminal; and
- performing, based on the third adjustment parameter, the first sound effect processing on the voice data to obtain the target voice data.

17. The non-transitory storage medium of claim 13, the operations further comprising:
- extracting accompaniment data corresponding to a target musical instrument from the accompaniment data in a case that the accompaniment data comprises the accompaniment data corresponding to the target musical instrument;
- acquiring a preset fourth adjustment parameter indicating a playing orientation of the target musical instrument; and
- performing, based on the fourth adjustment parameter, the second sound effect processing on the accompaniment data corresponding to the target musical instrument to obtain the target accompaniment data.

18. The non-transitory storage medium of claim 13, the operations further comprising:
- acquiring an additional adjustment parameter for the music file comprising at least one of pitch, timbre, loudness, and dynamic range; and
- processing at least one of the voice data and the accompaniment data based on the additional adjustment parameter.

* * * * *